United States Patent [19]
Nakanishi et al.

[11] 3,914,472
[45] Oct. 21, 1975

[54] PROCESS FOR METALLIZING THE SURFACE OF A POLYAMIDE RESIN MOLDED ARTICLE

[75] Inventors: Shigeaki Nakanishi, Toyota; Yoshio Takezawa, Chita; Akio Yamaguchi, Nagoya, all of Japan

[73] Assignee: Toray Industries, Inc., Tokyo, Japan

[22] Filed: Oct. 24, 1974

[21] Appl. No.: 517,480

[52] U.S. Cl. .................. 427/250; 427/38; 428/416
[51] Int. Cl. ....................... C01d 3/00; C23c 13/02
[58] Field of Search ............ 117/47 A, 71 R, 161 K, 117/161 KP; 260/830 R, 840

[56] References Cited
UNITED STATES PATENTS

| | | | |
|---|---|---|---|
| 3,393,087 | 7/1968 | Kamp et al. | 117/71 R |
| 3,646,749 | 3/1972 | Clough et al. | 117/71 R |
| 3,678,128 | 7/1972 | Riemhofer et al. | 117/161 K |

*Primary Examiner*—Cameron K. Weiffenbach
*Assistant Examiner*—Ralph E. Varndell

[57] ABSTRACT

The present invention relates to a process for preparing a surface-metallized polyamide resin molded article, which process comprises metallizing the surface of a polyamide resin by evaporation of a metal, characterized by using an undercoat composition consisting of (A) an alkyd resin and a methylolurea derivative or (B) an alkyd resin, a methylolurea derivative and epoxy resin, and freely imparting a lustrous metal surface with a brilliant pattern having excellent close adhesion to the surface of a polyamide resin molded article, by controlling the thickness and the hardening conditions of the applied undercoat film. The surface-metallized polyamide resin molded article has excellent heat resistance, chemical resistance, weatherability, fatigue resistance, and heat cycle resistance.

7 Claims, No Drawings

PROCESS FOR METALLIZING THE SURFACE OF A POLYAMIDE RESIN MOLDED ARTICLE

BACKGROUND OF THE INVENTION

The present invention relates to a process for evaporation metallizing a surface-metallized polyamide resin molded article in which the metallized metal surface has a luster, a rainbow pattern or a brilliant pattern and strongly adheres to the polyamide resin molded article.

DESCRIPTION OF THE PRIOR ART

Heretofore, it has been known to metallize the surfaces of various thermoplastic resin molded articles using processes having advantages such as productivity moldability, and lightweight, and to utilize the resulting surface-metallized molded articles as ornaments, decorations and reflection mirrors, for example. Recently, in the fields of use where a high degree of heat-resistance and environmental deterioration resistance are required, and metal luster is required for functional or decorational purpose, as in lamp housings, radiator or other grillwork on automobiles or street lamps, for example, demand for these surface-metallized resin molded articles has been considerable.

Accordingly, the properties and performance required of such surface-metallized resin molded articles has been increasingly stringent. For example, in lamp housings, heat resistance up to 130°– 160° C because of heat emitted from the light source is required. In the grillwork of an automobile, due to the high temperature inside the engine compartment, which has increased along with exhaust gas pollution countermeasures, very substantial heat resistance is required at present.

The close adhesion between a molded article thereof and a metal film is especially strong with ABS resin, modified polyphenylene oxide and polypropylene containing a filler. Other resins have not been satisfactory due to their poor adhesion to the metal film and to inadequate performance based thereon.

Surface-metallized ABS resin and modified polyphenylene oxide have excellent adhesion to the metal film, and excellent metal luster. However, the heat resistance of the resins per se is insufficient. Further, in the case of polypropylene containing a filler, due to development of flow marks caused by the presence of the additive used for improving plating properties, a product having a stable and excellent metal luster cannot be obtained, and also the heat resistance of the product is inadequate.

Polyamide resins per se are characterized by excellent heat resistance. However, the performance of surface-metallized polyamide resin molded articles has not been satisfactory to date. They have poor adhesion between the resin and the metal film, and have poor heat resistance. It has been known to subject the surface of a polyamide film to deposition of evaporated metal. However, the product does not have the required metallic appearance. Means for imparting metal surfaces of various patterns to a polyamide resin molded article have not been known, so far as we are aware.

OBJECTS OF THE INVENTION

A primary object of the present invention is to coat the surface of a polyamide resin molded article with evaporated metal to produce a product having excellent adhesion and heat resistance properties.

Another object of the present invention is to produce a surface-metallized polyamide resin molded article having an optional metal surface such as a metal surface having excellent luster, having a rainfow pattern or having a brilliant pattern, for a polyamide resin molded article.

Still another object of the present invention is to obtain a surface-metallized polyamide resin molded article having good adhesion and heat resistance properties without sacrificing chemical resistance, weatherability, fatique resistance, and heat cycle resistance.

The foregoing and other objects of the present invention may be achieved by providing a particular composition as a base coat between the substrate and the metal, upon subjecting a polyamide resin substrate to evaporation of a metal and controlling the thickness of a base coat film and the hardening conditions of said base coat.

SUMMARY OF THE INVENTION

The present invention relates to a process for metallizing the surface of a polyamide resin molded article which comprises applying to the surface of the article an undercoat composition obtained by blending about 20 – 95% by weight of an alkyd resin, about 80 – 5% by weight of a methylolurea derivative and about 0 – 10% by weight of an epoxy resin, the total amount being 100% by weight, to a film of average thickness of about 5 – 60µ, heat setting this film, and thereafter evaporation metallizing a metal on the hardened film.

The polyamide resin used as a substrate in the present invention may be a conventional nylon having a melting point of at least about 150° C, for example, a homopolymer such as nylon 6, nylon 66, nylon 610, or nylon 12, mixtures of these homopolymers, or copolymers of these homopolymers.

These polyamide resins may contain as an additive one or more inorganic fillers such as glass fibers, asbestos fibers, carbon fibers, potassium titanate fibers, wollastonite, mica, talc, clay or calcium carbonate, pigments, stabilizers or flame retardants so long as the addition thereof does not harm the surface performance of the product.

Especially, when performances of high degree are required in terms of cost, strength and heat resistance, it is preferable to apply the presesnt invention to a polyamide resin molded article containing a fibrous reinforcing agent such as glass fibers or a filler such as wollantosite, mica, talc or clay. The method of molding such polyamide resin molded article is not particularly limited. Any usual method of molding a thermoplastic resin, such as injection molding, extrusion molding, blow molding, etc. applies.

Prior to evaporation of the metal, the polyamide resin substrate is subjected to a base coat treatment applying a composition composed of an alkyd resin, a methylolurea derivative and an epoxy resin. Suitable alkyd resins for use herein include alkyd resins modified by oil (oil-modified alkyd resins), alkyd resins modified by vinyl polymers (vinyl polymer-modified alkyd resins) such as polystyrene, phenol, rosin and urethane, and oil-free alkyd resins. Especially preferable are alkyd resins modified by a hydrocarbon oil having a chain length below 50, oil-free alkyd resins or alkyd resin modified by vinyl polymers. One kind at least of these alkyd resins may be used in combination in an amount of about 20 – 95% by weight, preferably about 30 – 60% by weight of the base coat composition, calculated as solid. When the amount of the alkyd resin is more than 95% by weight, the surface appearance of metal deteriorates and when said amount is less than about 20%, the degree of adhesion between the substrate and the metal is decreased.

The methylolurea derivative used as a hardening component of the base coat composition in the present invention is obtained by hydroxymethylating urea with formalin, so treated as to become soluble in a common solvent for a resin component, to carry out a reaction with the resin component smoothly, and protected so that hardening does not take place during storage. For example, a material etherified by a lower alcohol such as methyl alcohol or butyl alcohol is preferable. A material derived by a third component other than a lower alcohol for other purposes may be used, so long as it does not obstruct the objects of the present invention. These methylolurea derivatives are blended at a ratio of about 80 – 5% by weight, preferably about 70 – 40% by weight of the base coat composition, calculated as solid. When this ratio is less than about 5% by weight, the metallic appearance of the evaporated article suffers, and when said ratio exceeds about 80% by weight, the firm adhesion of the evaporated film is insufficient.

When a methylolurea derivative, the acid value of which is less than 3.5, is used, the storage stability of the composition per se is excellent. On the other hand, the hardening speed of the composition is slow as compared to a derivative whose acid value is at least 3.5. When a methylolurea derivative, the acid value of which is less than 3.5, is used, it is possible to improve the hardening speed to the desired degree while retaining the desired storage stability and other properties, by adding and acid whose PKa is less than 3.0, preferably less than 2.2, in a small amount, to the composition.

PKa as herein referred to is defined in "Chemistry Handbood, Basis II", pages 1053 - 1058 published by Maruzen Co., Ltd. of Japan, as expressing a dissociation constant Ka given by the formula $[H^+][A^-]/[HA] = Ka$ with reference to an acid HA by the value of $PKa = -\log Ka$. Acids whose PKa values are less than 3.0 and which are usuable in the present invention, include sulfuric acid, sufurous acid, thiosulfuric acid, hydrochloric acid, phosphoric acid, phosphorous acid and nitric acid, sulfonic acids such as toluenesulfonic acid and aminosulfonic acid and carboxylic acids such as oxalic acid, maleic acid, o-phthalic acid and trichloroacetic acid. Even when the acid has PKa value of at least 3.0, for example, benzoic acid, acetic acid and itaconic acid, it is difficult to accelerate the hardening speed of the composition and to obtain a sufficiently hard hardened film, and the metal appearance after evaporation of the metal is not satisfactory. One or more acids whose PKa's are less than 3.0 are combined and added to the base coat composition in an amount of about $0.1 \times 10^{-3} - 10 \times 10^{-3}$ mol, preferably about $0.2 \times 10^{-3} - 5 \times 10^{-3}$ mol based on 100 parts by weight of said composition. When the added amount is less than about $0.1 \times 10^{-3}$ mol, a hardened film having sufficient hardness cannot be obtained, and when the added amount is more than about $10 \times 10^{-3}$ mol, the gelatin speed of the composition becomes too fast and the heat resistance of the evaporated article decreases.

A composition consisting of said alkyd resin and methylolurea derivative only has a high heat resistance per se, and is excellent to some degree regarding adhesion to the polyamide resin and to the evaporated metal film. However, by blending specific epoxy resins with this composition, the firmness of adhesion between the resin and the metal film further improves sharply, and an excellent and practical base coat composition is obtained.

The epoxy resin used in the present invention has a molecular weight of about 300 – 1400, an epoxy equivalent of about 100 – 4000, and is a compound containing at least two epoxy groups in the molecule, or the ring of at least one of these opoxy groups opens. Such epoxy compound is represented by the general formula:

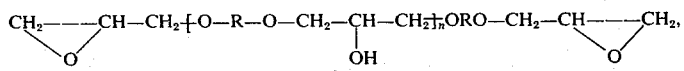

wherein R stands for

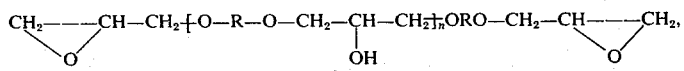

or a derivative thereof, $n$ is a number from 0 – 3.5, and a part of R may be substituted by a polyvalent hydroxyl group hydrocarbon compound such as ethylene glycol, propylene glycol, glycerine, resorcinol and a condensation product thereof.

These epoxy resins are blended in an amount of about 1 – 10% by weight, preferably about 3 – 9% by weight of the base coat composition calculated as solid. By addition of at least about 1% by weight of such epoxy resin, the firmness of adhesion improves sufficiently. However, by addition of more than about 10% by weight of such epoxy resin, the smoothness of the base coat film is lost and the appearance of the evaporated metal goes down.

The molecular weight and the epoxy equivalent of such epoxy resin affect the evaporated metal film, and when the molecular weight and the epoxy equivalent exceed the aforesaid ranges, the evaporated product does not have excellent balance of metal appearance or tight adhesion. When they are less than the aforesaid ranges, the volatility of the epoxy resin per se becomes great and the epoxy resin scatters at the time of heat setting the base coat, to reduce the added effect greatly.

The base coat treatment is carried out by blending the alkyd resin, the methylolurea derivative and the epoxy resin at said blending ratio so that the total amount is 100% by weight, dissolving the resulting blend in a volatile solvent such as an aromatic hydrocarbon, aliphatic hydrocarbon, alcohol, ketone, ether, or thinner to prepare a solution having a viscosity of 0.2 – 5 poises, applying said solution to the surface of a pure polyamide resin molded article by a spray gun or by immersion to an average film thickness of about 5 – 60μ, drying said film at room temperature for about 10 minutes - 3 hours, and thereafter heat setting the dried film in a baking furnace whose temperature is controlled to about 100°– 160° C. It is necessary that the thickness of the base coat film be within the aforesaid range. When the average thickness of the film is less than about 5μ, it is difficult to obtain a uniform metal surface of the evaporated article. Moreover, the firmness of adhesion is insufficient. On the other hand, when the average thickness of the film is more than about 60μ, orange-peeling and sagging effects are brought about in the evaporated article and the product does not have a good metal appearance.

The polyamide molded article, having been subjected to a base coat treatment, is next subjected to evaporation of the metal. This means adhering a metal in a gaseous state under a reduced pressure (or in vacuo) to a polyamide resin molded article subjected to a base coat treatment. Generically this includes ordinary vacuum evaporation, sputtering and ion plating, but is not particularly limited thereto. Although these methods are referred to under different names, there are slight variations in processes for gasifying metal. Direct heating and evacuating is called vacuum evaporation; the process of impinging a gas ion brought about by glow discharge upon a metal at a high voltage and causing the metal to be emitted in a gaseous state is called sputtering or ion plating. Actually, these procedures are about the same in principle. In other words, evaporation of metal in the present invention includes all methods by which metal particles are gasified, by whatever means, freely or forcibly, causing the metal to adhere to the surface of a molded article to form a metal film. Typical metals which may be used include aluminum, nickel, gold, silver, copper, and chromium. In general, the thickness of a film of a metal to be evaporated may be 1μ or less, from the economical viewpoint, in many cases. However, there is no objection to making it thicker should occasion demand.

In such treatment of evaporation of a metal, it is possible by controlling the thickness and hardening conditions of the base coat film to obtain a surface-metallized polyamide resin molded article having various types and configurations of metal surfaces, for example, a metal surface having a complete metallic luster or a metal surface having a brilliant pattern.

To obtain a metal surface having a complete metal luster, a base coat composition is applied so that the average thickness of the film becomes about 15 – 60μ, preferably about 20 – 50μ, heat setting said composition under conditions by which the gelation ratio of the base coat composition becomes at least about 92%, preferably at least 95%, and thereafter the metal may be evaporated onto the hardened film. The metal film obtained is free of patterns and of the orange-peeling problem and its surface has a complete, uniform metallic luster.

The term "gelation ratio" as referred to in the present invention means a value expressed by the following equation:

$$\frac{\text{Weight of substance insoluble in chloroform*}}{\text{Weight of the substance before extraction}} \times 100$$

*A residue after a substance is extracted at 23°C for 20 hours using a first class chloroform reagent.

When it is desired to obtain a metal surface appearance having a rainbow pattern, the base coat composition is applied to the surface of a molded article so that the average thickness of the film is about 5 – 15μ, preferably about 7 – 13μ, and the base composition is heat set so that the gelation ratio of the base coat composition is at least about 92%, preferably at least about 95%, and evaporation of metal is carried out on said hardened film.

In this case, it is necessary that the thickness of the film of the base coat should be within the aforesaid range. When the average thickness of the film is less than about 5μ, the firm adhesion of the evaporated film is insufficient and when the average thickness of the film is more than about 15μ, even if the following heat treatment is carried out, a rainbow pattern is not created.

The so-treated polyamide resin molded article does not have a rainbow pattern at stages mentioned so far. However, when the polyamide shaped article is heat-treated at a temperature from about 100°C to a temperature below the melting point of the polyamide for about 10 minutes to 3 hours, it is possible to develop a beautiful rainbow (iris) pattern. When the temperature of the heat temperature is less than about 100°C, the rainbow (iris) pattern does not develop. On the other hand, heat treatment at a temperature above about 200°C may possibly deteriorate and chemically transform the polyamide resin substrate. Therefore, such heat treatment should be avoided.

Furthermore, when a metal surface appearance having a rainbow pattern, a mosaic pattern or a brilliant pattern like oxidized (somber) silver is to be obtained, the base coat composition is applied to the surface of a molded article so that the average thickness of the film is about 5 – 60μ, preferably about 10 – 50μ, the resulting film is heat set so that the gelation ratio os the base coat composition becomes about 15 – 90% Thereafter, evaporation of the metal is carried out on said hardened film. Subsequently, by re-hardening the base coat film of this polyamide resin molded article, it is possible to develop a brilliant pattern on the surface of said molded article.

In this case, it is necessary that the thickness of the base coat film should be within the aforesaid range. When the average thickness of the film is less than about 5μ, the tight adhesion of the evaporated film is not sufficient, and when said average thickness of the film is more than about 60μ, an orange-peeling and sagging effect results and the polyamide resin molded article does not have a good surface.

In this case, it is necessary to make the gelation ratio of the undercoat film prior to evaporation of the metal about 15 – 90%, preferably about 30 – 80%. When the gelation ration of the undercoat film is less than about 15%, even if the subsequent treatment is carried out, the finished appearance becomes gray. When the gelation ratio is more than about 90%, the finished product has a metallic appearance, but in neither case can be objective brilliant pattern be obtained. In order to achieve the desired gelation ratio of such an undercoat film, the hardening conditions may be properly selected. When a hot air heating system is used, the gelation ratio can be controlled by controlling the heating temperature and the treating time. For example, when a hardening treatment is carried out for 30 minutes using a hot air dry furnace, when the temperature is 130°C, the gelation ratio of the undercoat film becomes 85%. In the case of an ordinary nylon 6 substrate, a rainbow pattern develops via the following treatment. In the case of a nylon 6 substrate containing glass fibers, a rainbow pattern having a flowing pattern develops.

Under the same conditions, when the temperature is 100° C, the gelation ratio of the undercoat film becomes 50%, the ordinary nylon 6 substrate develops a mosaic pattern, and the nylon 6 substrate containing glass fibers develops an oxidized (somber) silver pattern. On the other hand, under the same conditions, when the temperature is 150°C, the gelation ratio of the undercoat film becomes 95%, a brilliant pattern does not develop even if the subsequent treatment is carried out, and a product having a metallic appearance only is obtained. Under the same conditions, when the temperature is 80°C, the gelation ratio of the undercoat film is 13%, and even after the subsequent treatment, the surface develops with a gray appearance and a brilliant pattern is not obtained.

As such, it is possible to control the gelation ratio by changing the heating temperature, and to control the gelation ratio by changing the treating time.

The gelation ratio of an undercoat film varies, depending upon the kind and blending ratio of various resin components blended with the undercoat composition. Existence of a hardening promoting agent and the acid value of a methylourea derivative affects the gelation ratio. The methylolurea derivative is dissolved using a solvent consisting of 70 parts by weight of xylene and 30 parts by weight of n-butanol to prepare a 60 % by weight solution, which is measured according to the method of JIS 5400-1959, 8.4.1E. Namely, when the acid value of the methylolurea derivative is high, it is necessary to relax the hardening conditions. When said acid value is low, it is necessary to strengthen the hardening conditions. Again, by adding an acid whose dissociation constant is at least about $10^{-3}$, for example, sulfuric acid hydrochloric acid, phosphoric acid and toluenesulfonic acid, it is possible to relax the hardening conditions. For example, when an undercoat composition with a methylolurea derivative having an acid value of 3.7 is heat treated at 150° C for 30 minutes, the gelation ratio becomes 95% and a brilliant pattern is not achieved. However, when the undercoat composition using a methylolurea derivative has an acid value of 1.4, the gelation ratio becomes 86%, or lower than that when the acid value is 3.7, and a rainbow pattern is attained. On the other hand, with an undercoat composition using a methylolurea derivative having an acid value of 1,4, together with P-toluenesulfuonic acid in an amount of $1.6 \times 10^{-3}$ mol/100 g of the solid component, heat treating results in a gelation ratio of 94% and a brilliant pattern is not attained.

Because hardening conditions for obtaining the desired gelation ratio vary depending upon the composition of the undercoat composition, it is necessary to determine the heating temperature and treating time by taking these factors into account.

A polyamide resin molded article treated by metallizing can develop a beautiful brilliant pattern by re-hardening the undercoat composition. This re-hardening treatment is carried out by the same process as in heat setting the undercoat film. It is preferable to select conditions for treatment such that the gelation ratio of the undercoat film is greater than the of the pre-treated film by at least 5%. From the viewpoint of the environmental deterioration and hardness of the film, it is preferable to make the gelation ratio of the undercoat film at least about 70%, preferably at least about 80%. However, a lesser value sometimes suffices, depending upon the ultimate use of the product.

Because a re-hardening treatment at a temperature above 200°C may possibly deteriorate and transform the polyamide resin substrate, it is preferable to avoid treatment at such a temperature.

In the resulting surface-metallized polyamide resin molded article, the metal film and the resin strongly adhere to each other via the base coat film. The metal surface is very smooth and excellent in luster. In addition, it has an optional pattern.

Preferably, it is desirable to apply a further top coat film to the metal evaporated surface, to protect the metal surface. Such top coat should be transparent per se, should have a high degree of heat resistance, and should adhere firmly to the evaporated metal film and/or the aforesaid base coat. It should have excellent environmental deterioration resistance, to ultraviolet rays and to chemicals.

An excellent top coat film may be made of a thermosetting resin mixture consisting of an amino group such as a methylolmelamine derivative or a methylolguanamine derivative as a hardening component, and an acryl resin having a functional group which is reactive with said amino group (for example, a —COOH group or an —OH group), an oil-modified alkyd, a vinyl polymer-modified alkyd or an oil-free alkyd or a compound containing N-methylolacrylamide, N-methylol-methacrylamide or a derivative thereof, capable of bringing about a hardening - type reaction even if not mixed with said amino group as a copolymerizable component, or a so-called self cross-linking resin may be cited.

Especially preferable as a top coat is the aforesaid thermosetting resin of the acryl series, which consists of acrylic acid and/or methacrylic acid or the product obtained by radical polymerization of at least one kind of alkyl ester of these acids copolymerizing with another copolymerizable vinyl monomer such as, for example, styrene, acrylonitrile, hydroxyalkyl acrylate and hydroxyalkylmethacrylate (as occasion demands), and by forming a thermosetting resin concurrently with an amino resin. Further, an acryl resin may be copolymerized besides the aforesaid resin components, with N-methylol acrylamide or N-methylolmethacrylamide to be formed as a self cross-linking resin which is useful as a top coat.

These top coat compositions are applied as solutions or dispersions by spraying, immersion or electrolytic coating to the surface of the evaporated metal to a thickness of about 10 – 50μ. The product is thereafter set at room temperature for about 10 minutes to 3 hours and thereafter hardened in a baking furnace kept at a temperature of about 120° – 160° C for about 10 minutes to 3 hours to produce the top coat. When hardening is not sufficient, the molded article is not desirable. It is not preferable to carry out hardening at a temperature of 180° C or more for a long time because of deterioration due to thermal degradation of the polyamide resin.

A step of adhering the top coat may be carried out before or after heat-treating when a rainbow pattern is to be obtained, and before or after re-hardening when a brilliant pattern is to be obtained. More coveniently, it is possible to adhere the top coat film before the heat treatment and the re-hardening treatment, and to carry out hardening of the top coat simultaneously with the heat treatment and the re-hardening treatment of the base coat film.

In the present invention, it is possible to add a stabilizer, a coloring agent and/or a hardening promoting agent to the base coat composition and/or to the top coat composition, within the ranges stated, without departing from the spirit of the present invention.

The so-obtained surface-metallized polyamide resin molded article of the present invention has excellent tight and firm adhesion, heat resistance and heat cycle resistance. In addition, it has good metallic luster, strength, is lightweight and has good surface flame retardant properties. Therefore, it is very useful for use on automobiles, electric appliances for home use and building materials. For example, it is useful for head-lamp housings, tail-lamp housings, grilles and bumpers of automobiles, street lamps, advertising lamps and curved mirrors, for example.

Hereinbelow, the present invention will be explained in more detail by reference to specific examples. These are intended to be illustrative but not limitative of the scope of the invention.

COMPARATIVE EXAMPLE 1

As one example of the prior art, an example illustrating vacuum evaporation of nylon will be given.

Using nylon 6 containing 30% by weight of glass fibers (CM1001G-30), manufactured by Toray Industries, Inc.) an $80 \times 120 \times 3$ mm rectangular plate was molded by an inline screw-type injection machine manufactured by Toshiba Machinery Co., Ltd. of Japan at a cylinder temperature of 250° C and a mold temperature of 80° C. The surface of the rectangular plate was wiped (rubbed) by gauge impregnated with isopropanol and dried well at room temperature. Thereafter, a solution was prepared by thoroughly mixing 80% by weight of SM 1568R, a paint for evaporation of nylon, manufactured by Red Spot Co., and 20% by weight of a thinner SV 2607. The mixture was sprayed on the surface of the rectangular plate, using a spray gun, to a thickness of about $30\mu$. The product was set at room temperature for 20 minutes. Next, the plate was treated in a baking furnace the temperature of which was controlled to 80°C for 1.5 hours. Next, the rectangular plate was taken out of the furnace and aluminum was vacuum evaporated, using a vacuum of $2 \times 10^4$ Torr, and thus deposited on the surface of the undercoat film by conventional means. Further, 75% by weight of SM 1677, a top coat paint manufactured by Red Spot Co. and 25% by weight of a thinner SV 2776 were mixed in advance. This mixture was applied to the evaporated surface of the rectangular plate, using a spray gun, and was treated at 80° C for 1 hour. An evaporated nylon article having an excellent metal luster was obtained.

In order to observe the performance characteristics of this article, the following tests were carried out. In order to evaluate adhesion, according to JIS D0202, 10 longitudinal lines and 10 transverse lines, or a total of 100 rectangles were cut on the top coat, using a razor blade, on which Scotch cellophane tape (CAT No. T-250) manufactured by Sumitomo 3-M Co., Ltd. of Japan was adhered as if it covered the rectangles. The adhered cellophane tape was peeled from one end in a perpendicular direction with a single stroke. The extent to which the evaporated aluminum film peeled off was checked. When the number of measures ($n$) on which evaporated aluminum remained was counted, the degree of adhesion was determined as $n/100$. The degree of adhesion of the nylon evaporated article of Comparative Example 1 was 60/100.

In order to check the heat resistance of the product, the nylon evaporated article was heat-treated inside an oven the temperature of which was controlled to 100° C for 1 hour. As a result, the evaporated aluminum film creased. At the same time, the metal luster surface changed to a rainbow pattern. Accordingly, by the aforesaid process, the heat resistant temperature was below 100° C and advantage was not taken of the heat resistance inherently possessed by nylon.

COMPARATIVE EXAMPLE 2

As another example of the prior art, plating on nylon was conducted.

A rectangular plate the same as that obtained in Comparative Example 1 was plated with nickel as an undercoat in accordance with the Marbon process, on which electrolytic copper was plated. The rectangular plate was etched at 65° C for 3 minutes, or at 35° C for 5 hours, with a liquid obtained by dissolving 430 g of chromic anhydride and 405 g of concentrated sulfuric acid in 1 liter of water. Next, the plate was immersed in 5% hydrochloric acid at 30° C for 1 minute. Thereafter, it was immersed in a catalyst bath manufactured by Okuno Pharmaceutical Co. of Japan at 20°C for 3 minutes, immersed again in 5% hydrochloric acid at 30° C for 2 minutes and immersed in a chemical nickel liquid manufactured by Okuno Pharmaceutical Co. at 30° C for 10 minutes. The product etched at 65° C swelled at this stage due to insufficient adhesion between the undercoated nickel and nylon. The product etched at 35° C, which was acceptable at this stage, was treated in a liquid obtained by dissolving 200 g of copper sulfate and 50 g of concentrated sulfuric acid in 1 liter of water at an electric current density of 0.5 A/dm$^2$ for 5 minutes and further at an electric current density of 4 A/dm$^2$ for 27 minutes to be plated with copper so that the thickness of copper plate film became about $30\mu$. At this stage, the copper plate swelled and a good surface-metallized nylon could not be obtained.

It will be shown by way of Examples that surface-metallized nylon obtained according to the present invention is far superior in performance as compared with prior art products obtained in Comparative Example 1 and Comparative Example 2.

EXAMPLE 1

The same rectangular plate as that used in Comparative Example 1 was wiped (rubbed) by gauge impregnated with isopropanol and dried well at room temperature. Thereafter, a base coat resin solution *1, prepared in advance, was applied to the surface of the rectangular plate at a spray pressure of 3 kg/cm$^2$, using a spray gun. Thereafter, the rectangular plate was set at room temperature for about 20 minutes, was put inside a baking furnace the temperature of which was controlled to 150° C, and was hardened for 30 minutes. The average thickness of the film of the base coat film obtained was $30\mu$, the gelation ratio of the base coat film was 94% and the pencil hardness of a base coat film applied to a tin plate under the same conditions was 2 H. Subsequently, the rectangular plate was taken out and metallized with aluminum in a vacuum of $2 \times 10^4$ Torr. Further, a top coat resin solution *2 prepared in advance was applied to the evaporated surface of said plate and baked and hardened under the same conditions as in the case of the base coat.

*1: The prodct obtained by mixing 40 g of palm oilmodified alkyd resin (Beckosol J 524, non-volatile component 60%, acid value 5.8, manufactured by Japan Reichhold Co., Ltd.) 53 g of a methylolurea derivative (Beckamine P-138, nonvolatile component 60%, acid value 3.7 manufactured by Japan Reichhold Co., Ltd.) and 7 g of an epoxy resin (Epicoat 815, epoxy equivalent 175 – 210, manufactured by Shell Oil Co., Ltd.) calculated as solid, with 100 g of xylene added and well mixed.

*2: The product obtained by mixing 60 g of acryl resin Coatax SB-202, non-volatile component 50%, manufactured by Toray Industries, Inc.) and 40 g of a methylolmelamine derivative (Superbeckamine J-820, non-volatile component 50%, manufactured by Japan Reichhold Co., Ltd.) calculated as solid, with 60 g of xylene added and mixed well.

The aforesaid evaporated article had excellent metal luster and excellent performance as follows:

Reflexibility of light at 60°   92%
Adhesion Test                   100/100
Heat Resistance
  Even if treated inside an oven at 150°C
  for 50 hours, the appearance did not
  change at all and close adhesion of
  100/100 was retained.

1000 hours or at 100° C for 5000 hours, and the product retained a level of about 70/100 in the adhesion test. Thus, the surface-metallized nylon made the most of the heat resistance inherently possessed by nylon.

EXAMPLES 2–6, COMPARATIVE EXAMPLES 3–6

In order to observe the influence of the mix ratio of alkyd resin and methylolurea derivative, Example 7 was repeated except for changing the mix ratio of the oil-modified alkyd resin and the methylolurea derivative of the base coat, as shown in Table 3, and changing the amount of epoxy resin added to 5% by weight. The results are shown in Table 3. The thickness of the films of these base coats were 25 – 35$\mu$.

Using the same rectangular plate as that used in Comparative Example 1, Example 1 was repeated except for changing the composition of the base coat to obtain a surface-metallized nylon. The results are shown in Table 1.

Table 1

| No. | Composition of base coat (a) | | Influence of Chemical Composition of Base Coat Adhesion | Metallic (1) Luster | Heat Resistance (2) | |
|---|---|---|---|---|---|---|
| | Hardening component | Resin component | | | Adhesion | Metallic Luster |
| E* 2 | Methylolurea derivative (b) | Alkyd (castor oil) (c) | 100/100 | 0 | 90/100 | 0 |
| E 3 | " | Alkyd (synthetic non-drying oil fatty acid) (d) | 90/100 | 0 | 80/100 | 0 |
| E 4 | " | Styrenated alkyd (e) | 100/100 | 0 | 70/100 | 0 |
| E 5 | " | Oil-free alkyd (f) | 90/100 | 0 | 60/100 | 0 |
| E 6 | " | Alkyd (rice bran oil) (g) | 100/100 | 0 | 80/100 | 0 |
| CE** 3 | " | Acryl (j) | 0/100 | 0 | — | — |
| CE 4 | Methylolmelamine derivative (h) | Alkyd (palm oil) (i) | 0/100 | 0 | — | — |
| CE 5 | " | Alkyl (j) | 10/100 | 0 | — | — |
| CE 6 | " | Alkyd (castor oil) (c) | 20/100 | 0 | — | — |

E* = Example;
CE** = Comparative Example
(1) Judged by the naked eye the symbol 0 indicated "good".
(2) Measured value after 20 hours at 150° C.
(a) A material having a hardening component/resin component ratio by weight of 40/60, mixed with xylene in an amount of 60 parts by weight to the total 100 parts by weight of the two components. Baking conditions were 140° C for 30 minutes.
(b) "Beckamine P-138" (acid value 3.7), manufactured by Japan Reichhold Co., Ltd.
(c) "Beckosol 1308", manufactured by Japan Reichhold Co., Ltd.
(d) "Beckosol OD-E-230-70", manufactured by Japan Reichhold Co., Ltd.
(e) "Styresole 4250", manufactured by Japan Reichhold Co., Ltd.
(f) "Beckolite M-6402-50", manufactured by Japan Reichhold Co., Ltd.
(g) "Beckosol J-541-60, manufactured by Japan Reichhold Co., Ltd.
(h) "Superbeckamine J-820", manufactured by Japan Reichhold Co., Ltd.
(i) "Beckosol J522", manufactured by Japan Reichhold Co., Ltd.
(j) "Coatax SB202", manufactured by Toray Industries, Inc.

As will be apparent from Comparative Examples 1 and 2, the close adhesion between nylon and aluminum film and the heat resistance as far superior to the prior art.

Referring to the heat resistance, it is true that the surface-metallized nylon of the present invention becomes less desirable in appearance and in tightness of adhesion if it is heat-treated at a high temperature for a long period of time. However, the appearance was not affected at all after said surface-metallized nylon was heat-treated at 150° C for 100 hours, at 130° C for From a paint for a base coat whose composition was based on the present invention, namely, consisting of an alkyd resin and a methylolurea derivative, it is possible to obtain surface-metallized nylon having excellent tight adhesion, excellent metallic luster and excellent heat resistance. In contrast thereto, from a paint for a base coat, whose composition is outside the range of the present invention, namely, using acryl instead of an alkyd resin or using a methylolmelamine derivative instead of methylolurea derivative, the products had remarkably low adhesion.

EXAMPLES 7 – 12, COMPARATIVE EXAMPLE 7

Even if the composition of a paint for a base coat consists of a 2-component system of an alkyd resin and a methylolurea derivative, surface-metallized nylon according to the present invention has by far superior performance as compared to the prior art. This is shown in Examples 2 – 6. However, depending upon usage, it is sometimes preferable further to improve the tightness of adhesion, and the heat resistance as well. In that case, it is further effective to add an epoxy resin in addition to the aforesaid 2-component system.

In order to observe the influence of adding an epoxy resin, Example 1 was repeated except for adding to the paint for a base coat, Epicoat 815, while varying the mix ratio. The results appear in Table 2. The thicknesses of the films of these base coat compositions were 25 – 35μ.

From the results shown in Table 2, it is apparent that about 1 – 10% by weight is a good mixing ratio for an epoxy resin. Addition of epoxy resin improves the adhesion and heat resistance of the base coat composition. However, when the amount of epoxy resin added exceeds about 10% by weight, both adhesion and heat resistance lower.

EXAMPLES 13 – 18, COMPARATIVE EXAMPLES 8 – 9

In order to observe the influence of the mix ratio of alkyd resin and methylolurea derivative, Example 7 was repeated except for changing the mix ratio of the oil-modified alkyd resin and the methylolurea derivative of the base coat, as shown in Table 3, and changing the amount of epoxy resin added to 5% by weight. The results are shown in Table 3. The thickness of the films of these base coats were 25 – 35μ.

Table 3

Influence of Mixing Ratio of Alkyd Resin and Methylolurea Derivative

| No. | Composition of Base Coat (%) | | | Hardness of base coat | Performances of Evaporated Article | | | |
|---|---|---|---|---|---|---|---|---|
| | Alkyd resin | Methylolurea derivative | Epoxy resin | | Metal appearance | Adhesion | Heat Resistance | |
| | | | | | | | Appearance | Adhesion |
| CE* 8 | 90 | 5 | 5 | B | Rainbow | 100/100 | Changed | 80/100 |
| E** 13 | 80 | 15 | 5 | F | SWLR* | 100/100 | 0 | 80/100 |
| 14 | 70 | 25 | 5 | H | 0 | 100/100 | 0 | 100/100 |
| 15 | 50 | 45 | 5 | 2H | 0 | 100/100 | 0 | 100/100 |
| 16 | 40 | 55 | 5 | 2 H | 0 | 100/100 | 0 | 100/100 |
| 17 | 30 | 65 | 5 | 2 H | 0 | 100/100 | 0 | 80/100 |
| 18 | 20 | 75 | 5 | 2 H | 0 | 100/100 | 0 | 80/100 |
| CE 9 | 85 | 5 | 2 H | 0 | 90/100 | 0 | 30/100 | |

Note) CE** = Comparative Example
E** = Example
SWLR* = somewhat like rainbow

When the amount of alkyd resin added was not less than 90% by weight or less than 20% by weight, the heat resistance lowered. Therefore, the objective surface-metallized nylon was not obtained.

EXAMPLES 19 – 23, COMPARATIVE EXAMPLES 10 – 11

In order to observe the influence of the molecular weight and the epoxy equivalent of the epoxy resin, Example 7 was repeated except for changing the epoxy resin of the base coat to those shown in Table 4 and changing the mix ratio and the alkyd resin. The results were as shown in Table 4. The thicknesses of the films of these base coats were 25 – 35μ and the pencil hardnesses of these base coats were H – 2 H.

Table 2

Influence of Mixing Ratio of Epoxy Resin

| No. | Composition of Base Coat (%) | | Base Coat Pencil hardness | Metal Appearance | Adhesion | Heat Resistance | |
|---|---|---|---|---|---|---|---|
| | Alkyd[a]/urea resin[b] | Epoxy resin[c] | | | | Appearance | Adhesion |
| E* 7 | 100 | 0 | 2 H | 0 | 90/100 | 0 | 80/100 |
| E 8 | 99 | 1 | 2H | 0 | 100/100 | 0 | 100/100 |
| E 9 | 97 | 3 | 2 H | 0 | 100/100 | 0 | 100/100 |
| E 10 | 95 | 5 | 2 H | 0 | 100/100 | 0 | 100/100 |
| E 11 | 93 | 7 | 2 H | 0 | 100/100 | 0 | 100/100 |
| E 12 | 90 | 10 | H | 0 | 100/100 | 0 | 90/100 |
| CE** 7 | 85 | 15 | F | Rainbow | 60/100 | Changed somewhat | 20/100 |

Notes: E* = Example;
CE** = Comparative Example
[a]"Beckosol J524", manufactured by Japan Reichhold Co., Ltd.
[b]"Beckamine P-138", manufactured by Japan Reichhold Co., Ltd.
[c]"Epicoat 815", manufactured by Shell Oil Co., Ltd.

From the results of Table 4, it is apparent that base coats using epoxy resins of molecular weights less than 1400, and the epoxy equivalents of which were less than 1025, gave surfacemetallized nylon which surface-metallized excellent in metallic appearance, adhesion and heat resistance, whereas base coats using epoxy resins whose molecular weights were not less than 1400 produced orange-peeling and did not produce a surface-metallized nylon product having a good appearance.

acid catalyst. The test results of such products are shown below.

As a paint for a base coat, the one used was obtained by well mixing 53 g of a methylolurea derivative having an acid value of 1.2 (Beckamine P-138, manufactured by Japan Reichhold Co., Ltd.), 40 g of an oil-modified alkyd resin (Beckosol J-524, manufactured by Japan Reichhold Co., Ltd.) and 7 g of an epoxy resin (Epicoat 815, manufactured by Shell Oil Co., Ltd.) calculated as solid, added with P-toluenesulfonic acid in amounts Table 4

| No. | Alkyd (%) | MUD* (%) | Influence of Kind of Epoxy Resin | | | Metallic Appearance | Adhesion | Heat Resistance | |
|---|---|---|---|---|---|---|---|---|---|
| | | | Amount added | Molecular weight | Epoxy Equivalent | | | Appearance | Adhesion |
| E* | 55.5 | 39.0 | 5.5 | a) | 175 – 210 | 0 | 100/100 | 0 | 100/100 |
| 20 | " | " | " | 380$^{b)}$ | 175 – 210 | 0 | 100/100 | 0 | 100/100 |
| 21 | " | " | " | 470$^{c)}$ | 225 – 290 | 0 | 100/100 | 0 | 90/100 |
| 22 | " | " | " | 900$^{d)}$ | 450 – 525 | 0 – Δ | 100/100 | 0 | 80/100 |
| 23 | " | " | " | 1400$^{e)}$ | 870 – 1025 | 0 – Δ | 100/100 | CSW* | 80/100 |
| CE**$_{10}$ | " | " | " | 2900$^{f)}$ | 1650 – 2050 | op* | — | — | — |
| 11 | " | " | " | 3750$^{g)}$ | 2400 – 4000 | op* | — | — | — |

NOTE:  E* = Example
CE* = Comparative Example
MUD* = Methylolurea Derivative, op* = orange-peeling,
CSW* = changed somewhat
(A) observed by the naked eye,  0 = good,  0 – Δ considerably good
$^{a)}$"Epicoat 815", manufactured by Shell Oil Co., Ltd.
$^{b)}$ "Epicoat 828", manufacturee by Shell Oil Co., Ltd.
$^{c)}$"Epicoat 834", manufactured by Shell Oil Co., Ltd.
$^{d)}$"Epicoat 1001", manufactured by Shell Oil Co., Ltd.
$^{e)}$"Epicoat 1004", manufactured by Shell Oil Co., Ltd.
$^{f)}$"Epicoat 1007", manufactured by Shell Oil Co., Ltd.
$^{g)}$"Epicoat 1009", manufactured by Shell Oil Co., Ltd.

EXAMPLES 24 – 29, COMPARATIVE EXAMPLES 12 – 13

When the acid value of a methylolurea derivative is high, this is preferable since hardening proceeds easily. However, when a paint for a base coat is prepared, gelation proceeds and the paint sometimes becomes useless within a relatively short time during storage. On the other hand, when the acid value of the methylolurea derivative is low, its storage stability is excellent. However, there is a deficiency that hardening is slow. In order to prepare a base coat having excellent storage stability, the hardening speed of which is in a practical range, it is sometimes preferable to use a methylolurea derivative which is low in acid value together with an shown in Table 5 and 100 g of xylene. Other conditions were according to Example 1 in obtaining a surface-metallized nylon. The results are shown in Table 5.

As will be apparent from the fact that when a material having a low acid value was used as a methylolurea derivative, the pencil hardness of the base coat was low. Under practical baking conditions, hardening did not proceed to a sufficient degree. On the other hand, when the amount of acid added was too large, haze was caused. At the same time, the heat resistance and conservation lowered. Accordingly, a preferable adding amount of P-toluenesulfonic acid toward a methylolurea derivative whose acid value was less than 3.5 is selected from the range of $0.1 \times 10^{-3}$ - $10 \times 10^{-3}$ mol/100 g.

Table 5

| | No. | Added Amount of Acid × $10^{-3}$ mol/ 100 g | Gelation Speed 60° C | Pencil Hardness of Base Coat | Performance of Evaporated Article | | |
|---|---|---|---|---|---|---|---|
| | | | | | Metallic Appearance A) | Adhesion | Heat Resistance B) |
| CE* | 12 | 0 | >20 days | HB | X$^{1)}$ | — | — |
| E** | 24 | 0.2 | " | H | 0 | 100/100 | 0 |
| | 25 | 0.5 | " | 2H | 0 | " | 0 |
| | 26 | 1.0 | " | " | 0 | " | 0 |
| | 27 | 3.0 | " | " | 0 | " | 0 |
| | 28 | 5.0 | " | " | " | 0 | |
| | 29 | 10.0 | 14 days | " | 0 | " | 0 |
| CE | 13 | 15.0 | 7 days | " | Δ$^{2)}$ | " | X |

CE* = Comparative Example,
E** = Example
A) observation by the naked eye;
0 = good
Δ = rather good, X = poor
B) Metallic appearance after heat-treatment at 180° C for 2 hours
1) rainbow pattern
2) haze pattern

EXAMPLES 30 – 36, COMPARATIVE EXAMPLES 14 – 18

Examples 24 – 29 were repeated except for using a methylolurea derivative having an acid value of 2.0, changing the acid to that shown in Table 6, and making the added amounts of these acids $2.0 \times 10^{-3}$ mol/100 g in order to observe the influence of the PKa of the acid catalysts added in obtaining surface-metallized nylon. The results are shown in Table 6.

EXAMPLES 37 – 40

Rectangular plate molded articles made of injection molded nylon 6 (CM1011C, manufactured by Toray Industries, Inc.), nylon 66 (CM3001C, manufactured by Toray Industries, Inc.), nylon 610 (CM2001, manufactured by Toray Industries, Inc.) and nylon 6 melt-mixed with 40% by weight of Wollastonite P-1 as an inorganic filler were evaporated by the same method as that in Example 7 to obtain surface-metallized nylon articles. The results are shown in Table 7.

Table 6

Influence of PKa of Acid

| No. | | Acid | | Pencil Hardness of Base Coat | Performance of Evaporated Article | | |
|---|---|---|---|---|---|---|---|
| | | Name of Acid | Pka | | Metallic Appearance | Adhesion | Heat Resistance (a) |
| E* | 30 | Sulfuric acid | <1 | 2H | 0 | 100/100 | 0 |
| | 31 | Phosphoric acid | 2.15 | " | 0 | 100/100 | 0 |
| | 32 | P-toluenesulfonic acid | <1 | " | 0 | " | 0 |
| | 33 | Oxalic acid | 1.27 | " | 0 | " | 0 |
| | 34 | Maleic acid | 1.94 | H | 0 – Δ | " | Δ |
| | 35 | Phthalic acid | 2.95 | " | Δ | " | Δ |
| | 36 | Malonic acid | 2.85 | " | Δ | " | Δ |
| CE** | 14 | Benzoic acid | 4.20 | F | X | — | — |
| | 15 | Acetic acid | 4.76 | " | X | — | — |
| | 16 | Butyric acid | 4.82 | " | X | — | — |
| | 17 | Succinic acid | 4.81 | " | X | — | — |
| | 18 | Itaconic acid | 3.85 | " | X | — | — |

E* = Example
CE** = Comparative Example
(a) appearance after being heat treated at 180° C for 2 hours.

Table 7

| No. | Substrate Resin | Properties of Evaporated Article | | |
|---|---|---|---|---|
| | | Metallic Appearance | Adhesion | Heat Resistance a) |
| Example 37 | Nylon 6 | 0 | 100/100 | 0 |
| 38 | Nylon 66 | 0 | 100/100 | 0 |
| 39 | Nylon 610 | 0 | 100/100 | 0 |
| 40 | Nylon 6 containing 40% of wollastonite | 0 | 100/100 | 0 | a) = change of appearance after being heat-treated at 100° C for 20 hours. The performances of the evaporated articles were all excellent.

From the results of Table 6, it is apparent that acids whose PKa's were at least 3.85 gave pencil hardnesses of F and insufficient in hardening. However, when using acids whose PKa's were not more than 2.95, especially not more than 2.2, the pencil hardnesses of the base coats reached not less than H and the evaporated articles were satisfactory in performance.

EXAMPLES 41 – 45, COMPARATIVE EXAMPLE 19

The relation between the thickness of a film of a base coat and performances as surface-metallized nylon were observed.

By the same method as in Example 26, except for changing the thickness of the film of the base coat only, surface-metallized nylon (CM1001G-30) articles were obtained. The results were as shown in Table 8.

Table 8

Influence of Thickness of Film of Base Coat

| No. | Thickness of Film of Base Coat ($\mu$) | Performance of Evaporated Article | | |
|---|---|---|---|---|
| | | Appearance | Adhesion | Heat Resistance (a) |
| Example 41 | 13 | SLR* | 100/100 | 0 |
| 42 | 17 | Metal appearance | 100/100 | 0 |
| 43 | 37 | " | 100/100 | 0 |
| 44 | 48 | " | 100/100 | 0 |
| 45 | 60 | " | 100/100 | 0 |
| Comparative Example 19 | 70 | " | 100/100 | Swelled |

(a) = Appearance after being heat-treated at 180° C for 2 hours.
SLR* = slight rainbow.

From the results of Table 8, it is known that when the thicknesses of the films of the base coats were not more than 60 μ, surface-metallized nylon articles having excellent close adhesion and heat resistance are obtained. Above all, when the thickness of the film is within the range of 15 – 60μ, surface-metallized nylon articles having metallic luster are obtained.

EXAMPLES 46 – 48, COMPARATIVE EXAMPLE 20

A method of controlling the thickness of a film of a base coat to 5 –15μ to obtain surface-metallized nylon article having rainbow patterns was observed.

1. From nylon 6 (CM1011C, manufactured by Toray Industries, Inc.) and nylon 6 containing glass fiber (CM1001G-30), 120 × 80 × 3 mm rectangular plates were injection molded, respectively.

2. 40 g of (A) an oil-modified alkyd resin (Beckosol J-524, non-volatile component 60%, acid value 5.8, manufactured by Japan Reichhold Co., Ltd.), 53 g of (B) butylated urea resin (Beckamine P-138, non-volatile component 60%, acid value 3.7, manufactured by Japan Reichhold Co., Ltd.) and 7 g of (C) an epoxy resin (Epicoat 815, epoxy equivalent 175 – 210, manufactured by Shell Oil Co., Ltd.) calculated as solid were mixed.

To 100 g of this resin solution was further added 50 – 900 g of xylene to prepare solutions of a base coat.

3. The surface of each of the molded articles obtained in (1), above was wiped (rubbed) by gauge impregnated with isopropanol and well dried. Thereafter, each of the solutions prepared in (2), above was sprayed at a spray pressure of 3 kg/cm$^2$ using a spray gun. In order to obtain base coat films of different thicknesses, the amount of xylene added and the spraying time were varied.

Thereafter, the molded articles were set at room temperature for about 20 minutes, charged into a baking furnace the temperature of which was adjusted to 150° C and hardened for 30 minutes to obtain hardened films having the thicknesses shown in Table 9. Thereafter, on each of these hardened films, aluminum was vacuum evaporated in a vacuum of $2 \times 10^{-4}$ Torr to form about 0.1μ thick aluminum films.

4. To each of these aluminum films, a solution to be applied as a top coat obtained by mixing 60 g of acryl resin (Coatax SB202, non-volatile component 50%, manufactured by Toray Industries, Inc.) and 40 g of butylated melamine resin (Superbeckamine J-820, non-volatile component 50%, manufactured by Japan Reichhold Co., Ltd.) calculated as solid and adding xylene to the resulting mixture so that the viscosity at room temperature became about 40 centipoises, was applied by the same method as that for the base coat and set at room temperature for about 20 minutes.

5. Each of these aluminum films was heat-treated at 150° C for 30 minutes. When the appearance and adhesion of each of the molded articles were checked, the results were as shown in Table 9.

Table 9

Relation Between Thickness of Film of Base Coat and Finish of Coat

| No. | Thickness of film of Base Coat | Nylon 6 Rainbow pattern (A) | Adhesion | Nylon 6 Containing Glass Fiber Rainbow Pattern | Adhesion |
| --- | --- | --- | --- | --- | --- |
| CE* 20 | 1 – 2 | Yes | 0/100 | Yes | 0/100 |
| E** 46 | 5 – 6 | Yes | 90/100 | Yes | 80/100 |
| 47 | 12 | Yes | 100/100 | Yes | 100/100 |
| 48 | 15 | Slightly Yes | 100/100 | Slightly Yes | 100/100 |

(A) Observed by the naked eye,
CE* = Comparative Example,
E** = Example.

From the results of Table 9, it is apparent that when the thickness of film of the base coat is not more than about 15μ, a rainbow pattern is brought about, and that it has a beautiful appearance. However, when the thickness of the film is about 1 – 2μ, the adhesion is lost. Therefore, it is necessary to make the thickness of the film of the base coat about 5 – 15μ.

EXAMPLES 49 – 57, COMPARATIVE EXAMPLE 21

The relation between the hardening ratio of a base coat before evaporation of aluminum and the finished appearance of a product when the thickness of the film of the base coat is at least 15μ, was observed.

1. Nylon 6 (CM1011C, manufactured by Toray Industries, Inc.) was projection shaped to form a 120 × 80 × 3 mm rectangular plate.

2. 40 g of (A) an oil-modified alkyd resin (Beckosol J-524, non-volatile component 60%, acid value 5.8, manufactured by Japan Reichhold Co., Ltd.), 53 g of (B) butylated urea resin (Beckamine P-138, non-volatile component 60%, acid value 3.7, manufactured by Japan Reichhold Co., Ltd.) and 7 g of (C) an epoxy resin (Epicoat 815, epoxy equivalent 175 – 210, manufactured by Shell Oil Co., Ltd.), calculated as solid were mixed. To 100 g of this resin solution was further added 50 g of xylene to prepare a solution to be applied as an undercoat.

3. The surface of the molded article obtained in (1), above was wiped (rubbed) and impregnated with isopropanol, and well dried. Thereafter, the solution to be prepared in (2) above was sprayed on said surface at a spraying pressure of 3 kg/cm$^2$ using a spray gun, so that the thickness of the film became 25 – 35μ and the resulting film was set at room temperature for about 20 minutes.

4. Thereafter, using a hot air heating type baking furnace, the undercoat film was hardened under conditions shown in Table 10 to obtain undercoat films which differed in gelation ratio.

5. Subsequently, on each of these hardened films, aluminum was vacuum evaporated in a vacuum of $2 \times 10^{-4}$ Torr to form about 0.1μ thick aluminum films.

6. On each of these aluminum films, a solution to be applied as a top coat obtained by mixing 60 g of acryl resin (Coatax SB 202, non-volatile component 50%, manufactured by Toray Industries, Inc.) and 40 g of butylated melamine resin (Superbeckamine J-820, non-volatile component 50%, manufactured by Japan Reichhold Co., Ltd.) calculated as solid and adding xylene to the resulting mixture so that the viscosity at room temperature became about 40 centipoise, was applied by the same method as that for the base coat film and set at room temperature for about 20 minutes.

7. Each of the nylon rectangular plates was heat-treated in a baking furnace at 150° C for 30 minutes to effect re-hardening of the undercoat film and hardening of the top coat film simultaneously. When the appearance and close adhesion of the molded articles were estimated, the results shown in Table 10 were obtained.

Table 10

| No. | Hardening Condition of Undercoats Film Temperature (°C) | Time (min) | Gelation Ratio of Undercoat Film (A) (%) | Properties of Shaped Article Appearance (B) | Adhesion |
|---|---|---|---|---|---|
| E* 49 | 150 | 30 | 95 | Metallic appearance | 100/100 |
| 50 | 140 | 30 | 90 | Rainbow Appeared Slightly | 100/100 |
| 51 | 130 | 30 | 85 | Rainbow pattern | 100/100 |
| 52 | 120 | 30 | 75 | " | 100/100 |
| 53 | 110 | 30 | 65 | " | 100/100 |
| 54 | 100 | 30 | 50 | Mosaic-like pattern | 100/100 |
| 55 | 90 | 30 | 35 | " | 100/100 |
| 56 | 90 | 20 | 30 | " | 100/100 |
| 57 | 90 | 10 | 20 | Somber silver pattern | 100/100 |
| CE** 21 | 80 | 30 | 15 | Gray | 100/100 |

E* = Example,
CE** = Comparative Example
(A) 1 g of the solution to be applied for the undercoat prepared in (2) step was placed into an aluminum cup, and treated under the foregoing hardening conditions. Thereafter, about 50 cc of a first-grade reagent chloroform was added thereto and allowed to stand at 23° C for 20 hours. Thereafter, it was filtered and dried. From the weight of the remaining substance, the gelation ratio was calculated.
(B) Observed by the naked eye.

As will be apparent from the results of Table 10, when hardening of the undercoat prior to evaporation treatment is so carried out as to make the gelation ratio at least 92%, a metallic appearance is brought about. When such hardening is so carried out as to make the gelation ratio below about 90%, a brilliant pattern is brought about. However, when the gelation ratio is less than about 15%, the surface of the aluminum film becomes gray and a brilliant pattern is not obtained. When the gelation ratio is about 90 – 65%, a beautiful rainbow pattern is obtained, and when the gelation ratio is about 50 – 30%, the aluminum film cracks and a beautiful mosaic pattern having another type of elegance is obtained.

EXAMPLES 50 – 66, COMPARATIVE EXAMPLE 22

Examples 49–57 were repeated except for using nylon 6 resin containing 30% by weight of glass fibers (CM1001G-30, manufactured by Toray Industries, Inc.) as a substrate resin, to obtain the results shown in Table 11.

Table 11

| No. | Hardening Condition of Undercoat Film Temperature (°C) | Time (min) | Gelation Ratio of Undercoat Film (%) | Properties of Shaped Articles Appearance | Adhesion |
|---|---|---|---|---|---|
| E*58 | 150 | 30 | 95 | Metallic appearance | 100/100 |
| 59 | 140 | 30 | 90 | Rainbow appeared slightly | 100/100 |
| 60 | 130 | 30 | 85 | Flowing rainbow pattern | 100/100 |
| 61 | 120 | 30 | 75 | " | 100/100 |
| 62 | 110 | 30 | 65 | Somber silver pattern | 100/100 |
| 63 | 100 | 30 | 50 | " | 100/100 |
| 64 | 90 | 30 | 35 | " | 100/100 |
| 65 | 90 | 20 | 30 | " | 100/100 |
| 66 | 90 | 10 | 20 | " | 100/100 |
| CE**22 | 80 | 30 | 13 | Gray | 100/100 |

Note:
E*=Example,
CE**=Comparative Example

From the results of Table 11, it is apparent that when the hardening conditions of a base coat film are so selected as to make the gelation ratio that is within the range of 15 – 90%, brilliant patterns are obtained. Moreover, when nylon containing glass fiber is made a substrate, a flowing rainbow pattern and a somber silver pattern different in elegance as compared with the case in which nylon 6 is used as a substrate, are obtained. When the gelation ratio of a base coat film is made at least 92%, surface-metallized nylon having a metal appearance is obtained.

EXAMPLES 67 – 72, COMPARATIVE EXAMPLES 23 – 24

Molded articles hardened and evaporation treated (gelation ratio of the undercoat film was 50%) were re-hardened under conditions shown in Table 12 without being applied by a top coat film and the relation between the rising ratio of the gelation ratio after re-hardening and occurrence of brilliant patterns was estimated. The results are shown in Table 12.

Table 12

| No. | Re-hardening Conditions Temperature (°C) | Time (min) | Rising Ratio of the Gelation Ration (A) | Brilliant Pattern | Hardness of Shaped Article (B) |
|---|---|---|---|---|---|
| CE* 23 | 230 | 30 | 49 | —(C) | — |
| E** 67 | 200 | 30 | 49 | Yes | 2 H |
| 68 | 160 | 30 | 49 | Yes | 2 H |
| 69 | 140 | 30 | 42 | Yes | 2 H |
| 70 | 120 | 30 | 29 | Yes | HB |
| 71 | 110 | 30 | 18 | Yes | B |
| 72 | 100 | 30 | 5 | Slightly Yes | 2 B |
| CE 24 | 80 | 30 | 2 | No | 3 B |

NOTE:
CE* = Comparative Example,
E** = Example
(A) (gelation ratio after being re-hardened) - 50
(B) The highest pencil hardness at which the molded article was not damaged when it was scratched with a pencil.
(C) The molded article transformed due to heat.

From the results of Table 12, it is apparent that by raising the gelation ratio at least by about 5% by re-hardening, a brilliant pattern develops, and when the hardness and environmental deterioration of a film are taken into account, it is preferable to make the final gelation ratio at least about 70%, preferably at least about 80%, and a re-hardening temperature of more than about 200° C is not preferable because it brings about thermal degradation of the substrate.

What is claimed is:

1. A process for metallizing the surface of a polyamide molded article which comprises the steps of applying to the surface of the polyamide molded article an undercoat composition obtained by blending about 20 − 95% by weight of an alkyd resin, about 80 − 5% by weight of a methylolurea derivative and about 0 − 10% by weight of an epoxy resin to bring the total amount to 100% by weight, controlling the film to an average thickness of about 5 − 60$\mu$, heat-setting this film and thereafter evaporating a metal on said hardened film.

2. A process according to claim 1, wherein said epoxy resin has a molecular weight of about 300 − 1400 and an epoxy equivalent of about 100 − 1025, and is present in an amount of about 1 − 10% by weight of said undercoat composition.

3. A process according to claim 1, wherein a methylolurea derivative having an acid value of not more than 3.5 is used as said methylolurea derivative and an undercoat composition is added which contains an acid whose PKa is not more than about 3.0 in an amount of $0.1 \times 10^{-3} - 10 \times 10^{-3}$ mol based on 100 parts by weight of said composition.

4. A process according to claim 3, wherein said undercoat composition is applied to an average film thickness of about 15 − 60$\mu$, said film is heat-set to a gelation ratio of at least about 92% and thereafter metal evaporation is carried out on said hardened film to obtain a polyamide resin molded article having a complete surface metallic luster.

5. A process according to claim 3, wherein said undercoat composition is applied to an average film thickness of about 5 − 15$\mu$, said film is heat-set to a gelation ratio of at least 92%, and thereafter a metal is evaporated on said hardened film and said molded article is heat-treated at a temperature within the range from about 100° C to the melting point of the polyamide to obtain a polyamide resin molded article having a rainbow surface pattern.

6. A process according to claim 3, wherein said undercoat composition is applied at an average film thickness of 5 − 10$\mu$, said film is heat-set to a gelation ratio of about 15 − 90% and thereafter a metal is evaporated on said hardened film and the film of said undercoat composition is re-hardened to obtain a polyamide resin shaped article having a brilliant surface pattern.

7. A process according to claim 1, wherein a top coat film is applied on the metal evaporated surface.

* * * * *